Feb. 2, 1937.   F. S. STICKNEY   2,069,509
TEMPERATURE INDICATING SYSTEM
Filed July 31, 1935
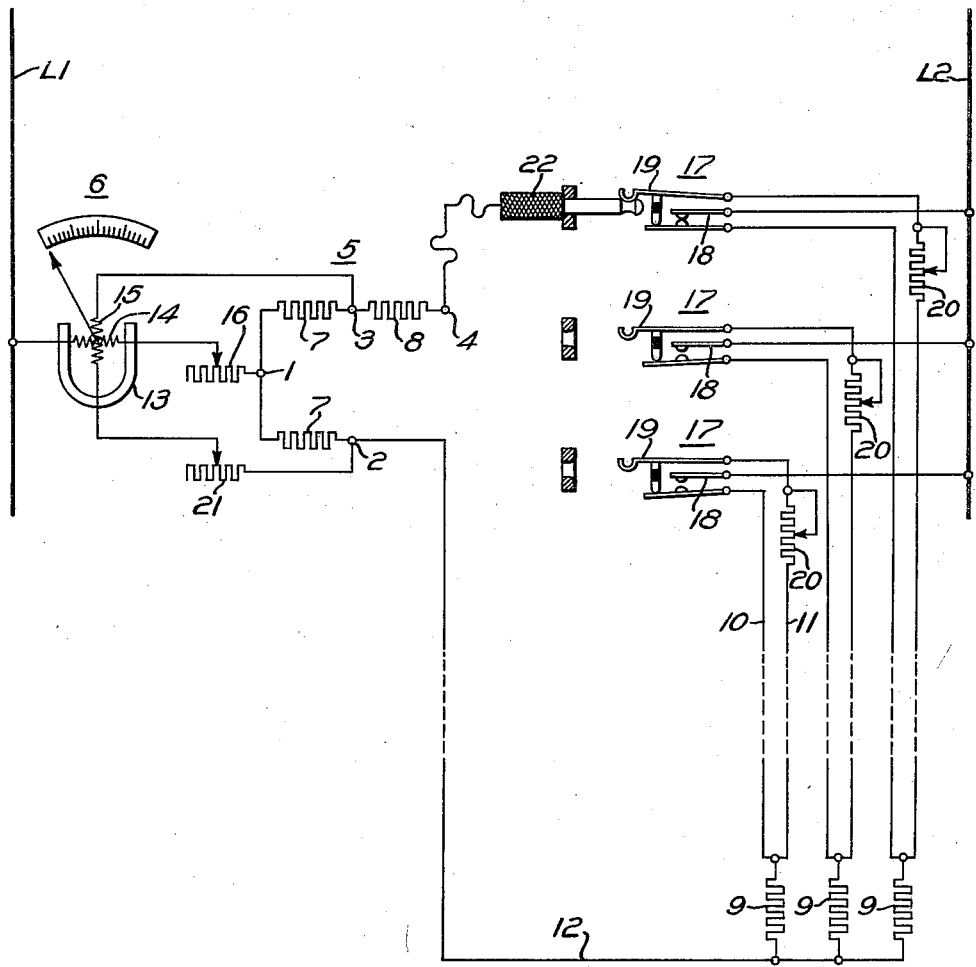
WITNESSES:
INVENTOR
Fernald S. Stickney.
BY
ATTORNEY Patented Feb. 2, 1937

2,069,509

UNITED STATES PATENT OFFICE 2,069,509

TEMPERATURE INDICATING SYSTEM

Fernald S. Stickney, Verona, N. J., assignor to Westinghouse Electric & Manufacturing Company, East Pittsburgh, Pa., a corporation of Pennsylvania Application July 31, 1935, Serial No. 34,014

3 Claims. (Cl. 73—32)

My invention relates to temperature indicating systems and particularly to such systems in which a single electrical measuring instrument is arranged to indicate the temperature at any of a number of points by means of a plurality of temperature responsive elements, such as search resistors, located at the various points where temperatures are to be ascertained.

In such systems it is usual to provide a Wheatstone bridge circuit having a pair of diagonally opposite terminals connected to a suitable source, and the remaining pair of diagonally opposite terminals connected to the sensitive element of the indicating instrument. Some form of switch is provided for switching the search coils successively into one arm of the bridge circuit, so that an individual reading of the instrument may be taken with each search coil in circuit. In order to respond to the very small voltage differences existing across the output terminals of the bridge, the indicating instrument must be quite sensitive. If the switch is arranged to open the bridge circuit entirely in changing from one search coil to another, a large part of the total voltage of the source will be impressed upon the sensitive element of the indicating instrument with consequent likelihood of damage to the instrument. In order to avoid this difficulty, it is usual to provide a switch having overlapping contacts so that when the search resistors are changed, the bridge circuit will not be open-circuited. However, during the transition period when two search coils are connected in the bridge circuit by the overlapping contact arrangement, the resistance of the corresponding arm of the bridge is approximately cut in half, and an undesirably large voltage is impressed upon the sensitive element of the indicating instrument.

In the systems of the prior art, the indicating element is usually a single coil device connected across a diagonal of the bridge circuit. Because of this connection, the current in the instrument coil is proportional to line voltage and any change of line voltage produces an error in the temperature reading.

In accordance with my invention I avoid the difficulties mentioned above by providing a second switch in series with the source and the input terminals of the bridge circuit. This switch is preferably interlocked with the switch for transferring the search resistors in and out of the bridge circuit, in such manner that the input terminals of the bridge circuit cannot be connected to the source, so long as the bridge circuit itself includes an open connection. Although there are a number of switch devices suitable for carrying out the purpose of my invention, I prefer to use plug and jack devices similar to those used in telephone circuits. I also provide a crossed-coil indicating instrument in place of the usual single coil instrument, and connect the crossed-coil instrument in a novel manner such that the effect of line voltage variations on the temperature readings is substantially eliminated.

It is accordingly an object of my invention to provide a novel temperature indicating system which will be free from errors caused by line voltage variations, within reasonable limits.

Another object of my invention is to provide a novel temperature indicating system having a Wheatstone bridge circuit and an indicating instrument energized from the bridge circuit, which will be provided with means for preventing the energization of the instrument when the bridge is in a highly unbalanced condition.

Other objects of my invention will become evident from the following detailed description taken in connection with the accompanying drawing in which the single figure is a diagrammatic view of a temperature indicating system embodying my invention.

Referring to the drawing in detail, a Wheatstone bridge circuit 5, having input terminals 1 and 4 and output terminals 2 and 3, is arranged to energize a suitable indicating instrument 6.

The bridge circuit 5 consists of a pair of equal resistors 7, a resistor 8 and any one of a plurality of search resistors 9, which may be located at suitable points where temperature conditions are to be ascertained, such as in the windings or bearings of electrical machines, or in the different rooms of a building. The resistor 8 has approximately the same resistance value as one of the search resistors 9.

One terminal of each of the search resistors 9 is connected to the bridge circuit 5 by means of a series conductor 10 and a compensating conductor 11. The remaining terminal of each of the search resistors 9 is connected to a terminal 2 of the bridge circuit 5 by any suitable means, such as a common return conductor 12. The compensating conductors 11 have approximately the same resistance and temperature coefficient as the common conductor 12 or other return conductor. With this arrangement, when the compensating conductor 11 is connected in one arm of the bridge circuit, and the corresponding search resistor 9 and the common return conductor 12 are connected in an adjacent arm of the bridge circuit, the resistance changes in the conductor 12 produced by ambient temperature variations are neutralized by the similar resistance changes produced in the compensating conductor 11.

The instrument 6 is preferably of the cross coil type, shown diagrammatically in the figure, comprising a stationary permanent magnet 13 and a movable armature positioned to be influenced by the field of the latter. The armature of the instrument 6 includes a pair of coils 14 and 15 mounted at an angle with respect to each other. The coil 14 is connected in series with an adjusting resistor 16 and the input terminals 1 and 4 of the bridge circuit 5 to a suitable source of direct current, indicated as a pair of supply conductors L1 and L2. The coil 15 is connected across the output terminals 2 and 3 of the bridge circuit 5, in series with an adjustable resistor 21, to respond to the difference of voltage existing across these terminals during unbalanced resistance conditions of the bridge circuit 5. The instrument 6 is preferably calibrated in temperature units, such as degrees centigrade, in order to give direct temperature readings.

Terminal 4 of the bridge circuit 5 is connected to a telephone plug 16 which may be inserted in any of a number of jacks 17, corresponding to the search resistors 9. Each of the jacks 17 includes a pair of normally open contacts 18, which can be closed only when the plug 16 has been inserted in the jack and has previously made contact with a spring contact member 19. The contacts 18 are arranged to connect the corresponding conductors 10 to the direct current source, and the spring contact member 19 is connected to the corresponding compensating conductor 11.

The search resistors 9 are resistance coils of material having a high temperature coefficient and in the case of protection of electrical coils, are wound with the coils themselves. If the temperature indicating system is used to measure the temperature of the various rooms of a building, the search resistors 9 may be located at suitable points in the rooms, in the usual manner. An adjusting resistor 20 is included in series with each compensating conductor 11, in order to provide an adjustment for minor irregularities of resistance when the apparatus is installed.

Preliminary to operations of the system, the resistors 16 and 21 are adjusted to bring the instrument deflection within the proper scale range, and the resistors 20 are adjusted so that the bridge 5 is balanced at a predetermined balance temperature of the search resistors 9.

The operation of the above described apparatus may be set forth as follows: With the plug 22 in the upper jack 17, as shown, the search resistor 9 at the extreme right of the figure is connected in the bridge circuit, and a voltage is impressed on the coil 15, dependent upon the degree of unbalance existing in the bridge circuit.

The coil 14 of the instrument 6 produces a flux component proportional to the line voltage, and the coil 15 produces a flux component proportional to the difference of voltage existing across the output terminal of the bridge circuit 5. The resultant of these two flux components causes the armature of the instrument 6 to rotate to a position in which the resultant lines up with the magnetic field produced by the permanent magnet 13. As both flux components depend upon line voltage, the effect of variations of line voltage is substantially eliminated, as the position of the flux resultant with respect to the instrument armature depends only upon the relative magnitudes of the flux components. The deflection of the instrument 6 depends upon the resistance of the search resistor 9, which is a function of its temperature. As mentioned above the instrument 6 is preferably calibrated in degrees.

If the plug 22 is withdrawn from the upper jack 17, the contacts 18 are first separated before the plug 22 leaves the spring contact member 19. The separation of the contacts 18 interrupts the energizing circuit for the bridge circuit 5, so that during the transition period no voltage is impressed upon the indicating instrument 6. As the withdrawing movement of the plug 22 is continued, the tip of the latter finally separates from the contact member 19, thereby interrupting the connection of the corresponding search coil 9 in the bridge circuit.

If the plug 22 is inserted in another jack 17, the sequence of connections is such that the mesh circuit of the bridge consisting of the resistors 7, 8 and 9 is completed before any voltage is applied across the input terminals of the mesh. In this way, the application of voltage to the indicating instrument 6 is prevented except at such times as the mesh is complete and in approximately balanced condition.

I do not intend that the present invention shall be restricted to the specific structural details, arrangement of parts, or circuit connections herein set forth, as various modifications thereof may be effected without departing from the spirit and scope of my invention. I desire therefore that only such limitations shall be imposed as are indicated in the appended claims.

I claim as my invention:

1. In temperature indicating apparatus, a source of electric power, an electrical indicating instrument, energizing means for said instrument including a Wheatstone bridge circuit having a first terminal connected to said source, second and third terminals connected to said instrument, and a fourth terminal, a plurality of search resistors at different locations, conductors for said search resistors including a series conductor and a compensating conductor connected to a common terminal of each of said search resistors, and conducting means connecting the remaining terminal of each of said search resistors to said second terminal of said bridge, a plug connected to said fourth terminal of said bridge, and a jack for each of said search resistors, each of said jacks including contact means effective upon insertion of said plug to connect said fourth terminal of said bridge to the corresponding compensating conductor and thereafter connect the corresponding series conductor to said source.

2. In temperature indicating apparatus, a source of electric power, an electrical indicating instrument, energizing means for said instrument including a Wheatstone bridge circuit having a first terminal connected to said source, second and third terminals connected to said instrument, and a fourth terminal, a plurality of search resistors at different locations, conductors for said search resistors including a series conductor and a compensating conductor connected to a common terminal of each of said search resistors, and conducting means connecting the remaining terminal of each of said search resistors to said second terminal of said bridge, said compensating conductors each having substantially the same resistance and substantially the same temperature coefficient of resistance as said conducting means, a plug connected to said fourth terminal of said bridge, and a jack for each of said search resistors, each of said jacks including contact means effective upon insertion of said plug to connect said fourth terminal of said bridge to the corresponding compensating conductor and thereafter connect the corresponding series conductor to said source.

3. In a temperature indicating apparatus, a source of electric power, an indicating instrument having a first and a second internal circuit, said instrument being of a type in which the indication is dependent upon opposing effects produced by the currents in said internal circuits, energizing means for said instrument including a Wheatstone bridge circuit having a first terminal connected to said source, second and third terminals connected to said first internal circuits, and a fourth terminal, said second internal circuit being connected in series with source and said first and fourth terminals, a plurality of search resistors at different locations, conductors for said search resistors including a series conductor and a compensating conductor connected to a common terminal of each of said search resistors, and conducting means connecting the remaining terminal of each of said search resistors to said second terminal of said bridge, a plug connected to said fourth terminal of said bridge, and a jack for each of said search resistors, each of said jacks including contact means effective upon insertion of said plug to connect said fourth terminal of said bridge to the corresponding compensating conductor and thereafter connect the corresponding series conductor to said source.

FERNALD S. STICKNEY.